United States Patent
Lotecka

(10) Patent No.: US 6,296,487 B1
(45) Date of Patent: Oct. 2, 2001

(54) METHOD AND SYSTEM FOR FACILITATING COMMUNICATING AND BEHAVIOR SKILLS TRAINING

(76) Inventor: Ernest L. Lotecka, 7510 Brava St., Carlsbad, CA (US) 92009

( * ) Notice: Subject to any disclaimer, the term of this patent is extended or adjusted under 35 U.S.C. 154(b) by 0 days.

(21) Appl. No.: 09/332,416

(22) Filed: Jun. 14, 1999

(51) Int. Cl.[7] ................................................. G09B 19/00
(52) U.S. Cl. ..................... 434/118; 434/156; 434/169; 434/185; 434/238; 434/322
(58) Field of Search ................. 463/30, 31, 35, 463/42; 434/118, 156, 157, 167, 169, 176, 185–238, 321, 322, 323, 335, 362

(56) References Cited

U.S. PATENT DOCUMENTS

| | | | |
|---|---|---|---|
| 4,305,131 | * 12/1981 | Best | 364/521 |
| 4,459,114 | * 7/1984 | Barwick | 434/307 |
| 5,302,132 | 4/1994 | Corder | 434/156 |
| 5,358,259 | * 10/1994 | Best | 273/434 |
| 5,393,070 | * 2/1995 | Best | 273/434 |
| 5,393,071 | * 2/1995 | Best | 273/434 |
| 5,393,072 | * 2/1995 | Best | 273/434 |
| 5,423,556 | * 6/1995 | Latypov | 273/434 |
| 5,999,729 | * 12/1999 | Tabloski, Jr. et al. | 395/701 |
| 6,106,399 | * 8/2000 | Baker et al. | 463/42 |

* cited by examiner

Primary Examiner—Valencia Martin-Wallace
Assistant Examiner—Julie Kasick
(74) Attorney, Agent, or Firm—John R. Ross; John R. Ross, III

(57) ABSTRACT

A method for operating a computer to teach a student communication skills. First a goal is displayed to the student. Then the student is presented with a prompting scene that is related to the goal that was presented to him. In the prompting scene there is a first character that represents the student. Also, there is at least one second character that represents at least one person to whom the student needs to communicate. Also displayed is a plurality of sentences the student may select. At least one of the sentences will help the student achieve his goal and at least one of the sentences will not help the student achieve his goal. The student's selection is then received. The student is then presented with a response scene. The response scene is positive if the student's selection from the plurality of sentences is such that it will help the student achieve his goal. The response scene is negative if the student's selection from the plurality of sentences is such that it will not help him achieve his goal. In a preferred embodiment, the student accesses a main programmed computer through the Internet.

19 Claims, 4 Drawing Sheets

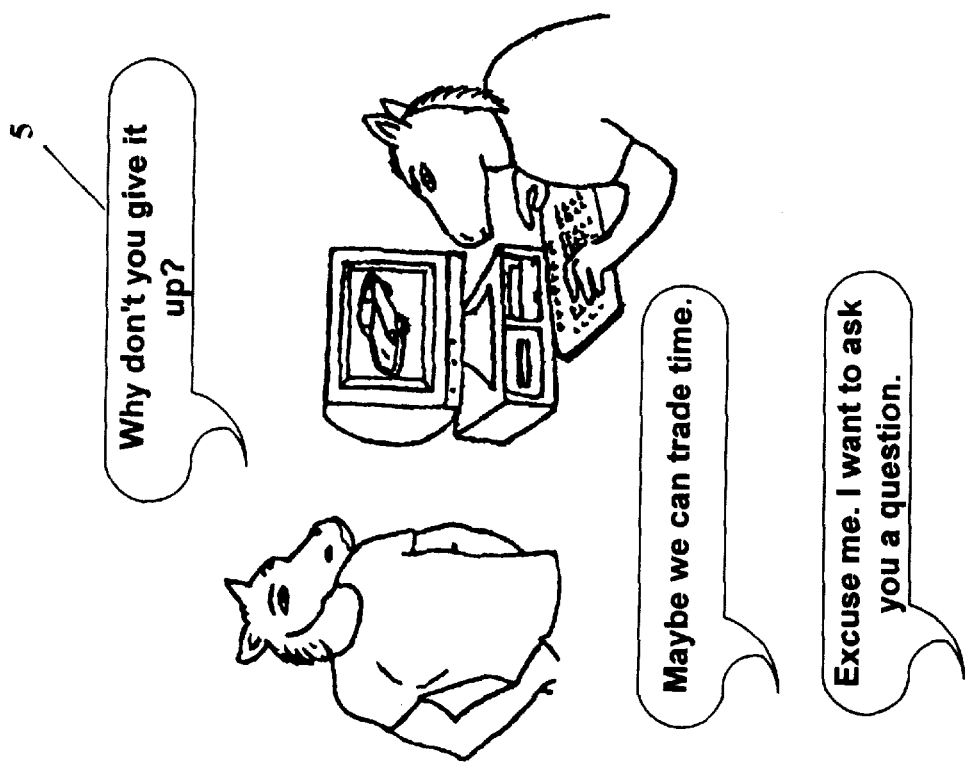
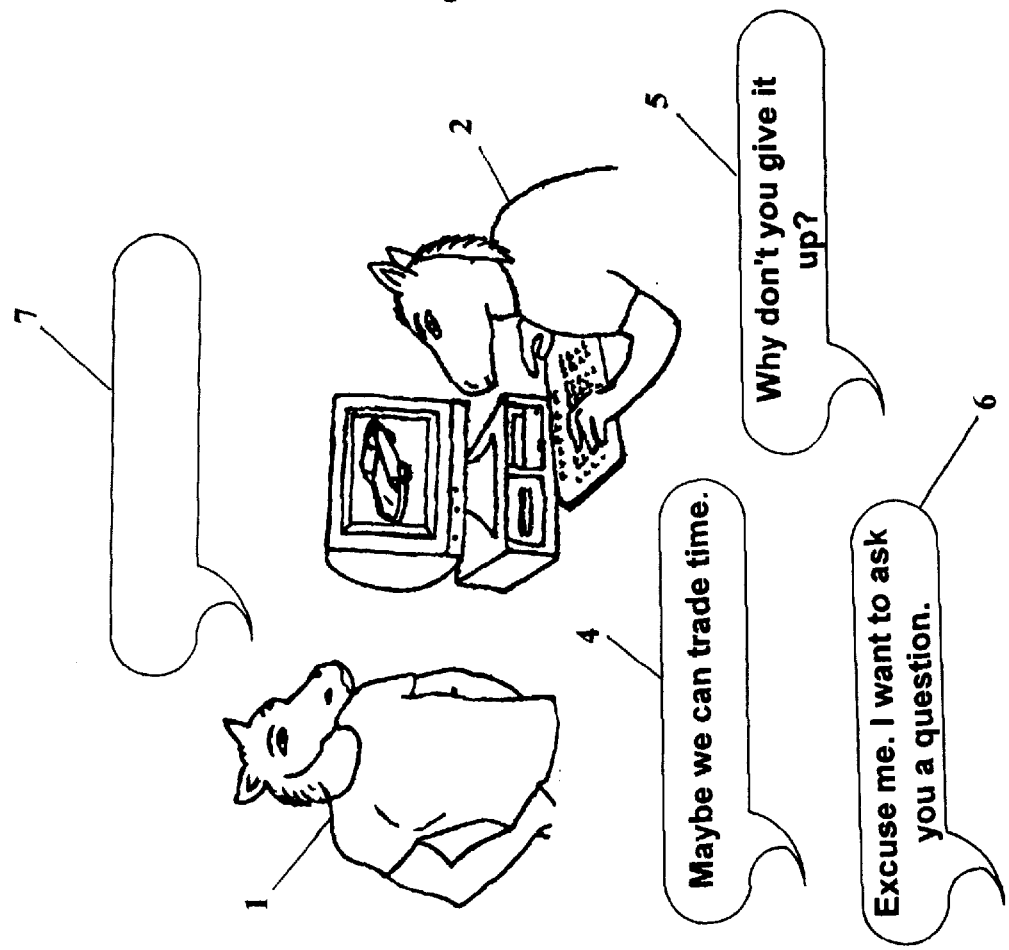
FIG. 2
FIG. 1

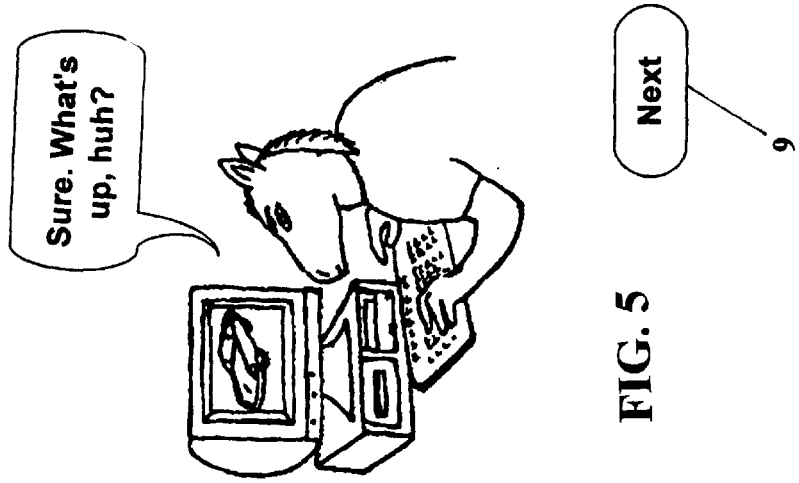
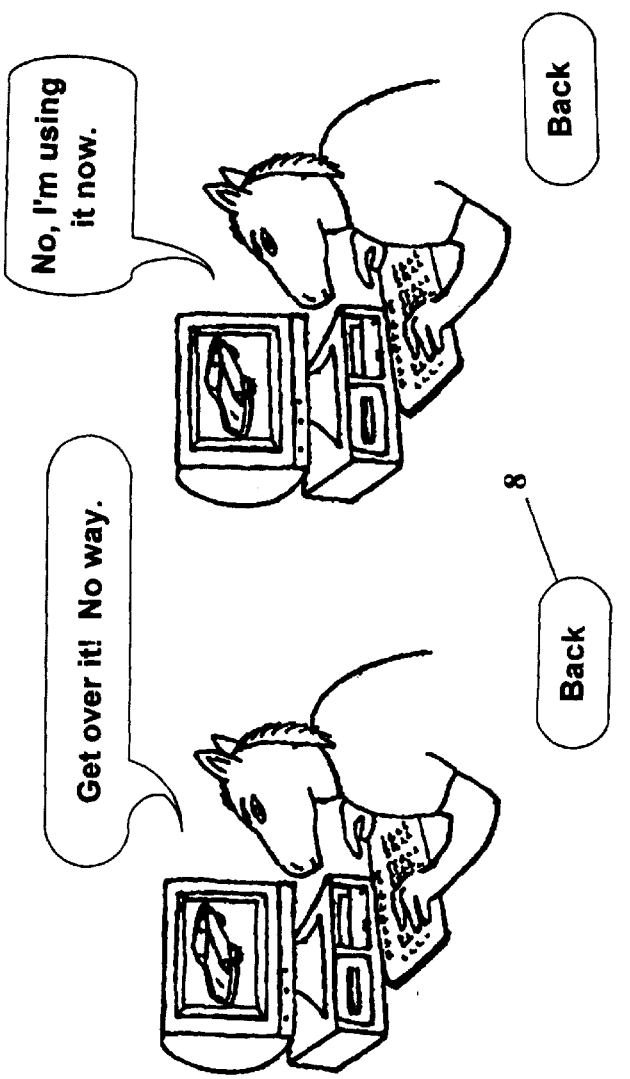

CHART 1

| Initiating Communication | Response | FH | S | CN | Follow up Communication | Response | FH | S | CN |
|---|---|---|---|---|---|---|---|---|---|
| Hello Beth. | Hi | 95% | 80% | 60% | Would you like to have dinner and see a movie with me tonight? | Sure. | 95% | 80% | 60% |
| | Huh? | 4% | 15% | 30% | | No, thank you. | 4% | 15% | 30% |
| | Get lost! | 1% | 5% | 10% | | Get lost! | 1% | 5% | 10% |
| Hey, Yo! | Hi | 60% | 40% | 5% | I want you to go have dinner and see a movie with me tonight. | Sure. | 60% | 40% | 5% |
| | Huh? | 35% | 40% | 15% | | No, thank you. | 35% | 40% | 15% |
| | Get lost! | 5% | 20% | 80% | | Get lost! | 5% | 20% | 80% |
| Hey you! Look Here! | Hi | 10% | 5% | 1% | You're going out with me tonight, and that's final. | Sure. | 10% | 5% | 1% |
| | Huh? | 70% | 35% | 10% | | No, thank you. | 70% | 35% | 10% |
| | Get lost! | 20% | 60% | 89% | | Get lost! | 20% | 60% | 89% |

FIG. 9

CHART 2

| Initiating Communication | Sure. | No, thank you. | Get lost! |
|---|---|---|---|
| Hello Beth. | 8% | 82% | 10% |
| Hey, Yo! | 2% | 10% | 88% |
| Hey you! Look Here! | .5% | 1.5% | 98% |

"Would you like to have dinner and see a movie with me tonight?"

FIG. 10

METHOD AND SYSTEM FOR FACILITATING COMMUNICATING AND BEHAVIOR SKILLS TRAINING

This invention relates to communication and behavior skills training systems and in particular to such systems utilizing interactive media.

BACKGROUND OF THE INVENTION

The Internet is a large connection of interconnected computers. Initially developed by the United States Defense Department, it has recently expanded to a great variety of uses. A significant percentage of the population in the United States and in many other countries currently has access to the Internet and its use is growing rapidly.

The Internet is used to advertise products. Many companies have WEB sites and encourage potential customers to "visit" these pages. Creation of WEB sites is a well-developed Internet business with a great many people and organizations offering to create WEB sites. In addition, many books are available at almost all good size book stores providing instructions for individuals to create their own WEB sites. One such book is *Build Your Own Web Site* by Louis Kahn and Laura Logan, published by Microsoft Press with offices in Redmond, Wash. Many, perhaps most, WEB sites are static, i.e. there is no interaction between the user and the WEB site. However, there are many well-known techniques that permit the WEB site to be made active as discussed at page 144–153 of the above reference. These techniques permit an Internet server to change WEB pages as often as desired and they permit users to communicate with a processor associated with the WEB site. With these techniques a user can access a WEB page containing a form containing information and blanks to be completed by the user. The WEB server is able to update the information on the form as often as desired. The user inserts called for information into the blanks on the form and with the click of his mouse transmits the completed form back to the processor associated with the WEB site. The processor can then process the information inserted by the user and the results of the processing can then be transmitted back to the user.

The technology also exists to establish a Local Area Network (LAN). A LAN is a distributed network of computers that are interlinked so that they can exchange information with each other.

An Intranet is a network connecting an affiliated set of users using standard Internet protocols, esp. TCP/IP and HTTP. Intranets—also known as Internal Webs—are only logically "internal" to an organization. Physically they can span the globe, as long as access is limited to a defined community of interest. To draw a comparison, the World Wide Web comprises all HTTP nodes on the public Internet. An internal web comprises all HTTP nodes on a private network, such as an organization's LAN or WAN. If the organization is a corporation, the internal web is also a corporate web.

In today's society, large identified populations of youth are often found alienated from their families, schools and communities, and become labeled as delinquent and disturbed due to their lack of constructive life skill development. Troubled youths that have been unable to learn positive communication skills may find it difficult to function in a normal society.

Research shows that problem youths, need structured guidance for learning pro-social behavior. To overcome the range of social and personal skill deficits, they require a combination of positive behavior models, appropriately challenging practice and continuing reinforcement. Currently, instruction of this quality is extremely rare.

Studies have shown that socially alienated youth respond especially well to interactive media. Youths who feel discomfort in a social environment, often are extremely comfortable interacting with a personal computer. Currently, popular computer activities socially alienated youths enjoy tend to focus on computer games and the Internet. However, unfortunately, the subject matter of the computer games and Internet WEB sites visited by these youths are often violent in nature, resulting only in reinforcing their antisocial behavior and poor communication skills.

Applicant is the author of 10 *Essentials for Career LIFE Decisions, Attention: A Guide to Enjoyably Increasing Your Effectiveness* and other competency enhancement curricula. Both his masters and doctoral work were media-based, focusing on psychosocial communication and change. In addition to positions as program developer, training director and career coach, he has conducted applied research in educational, developmental and consumer psychology.

Research in the area of behavioral science has shown that the ability to hold the attention of the student is extremely important in increasing learning, retention and performance.

What is needed is a better method and system for facilitating communication and behavior skills training.

SUMMARY OF THE INVENTION

The present invention provides a method for operating a computer to teach a student communication skills. First a goal is displayed on a computer screen to the student. Then the student is presented with a prompting scene that is related to the goal. In the prompting scene there is a first character that represents the student. Also, there is at least one second character that represents at least one person to whom the student needs to communicate. Also displayed is a plurality of sentences the student may select. At least one of the sentences will help the student achieve his goal and at least one of the sentences will not help the student achieve his goal. The student's selection is then received. The student is then presented with a response scene. The response scene is positive if the student's selection from the plurality of sentences is such that it will help the student achieve his goal. The response scene is negative if the student's selection from the plurality of sentences is such that it will not help him achieve his goal. In a preferred embodiment, the student accesses a programmed computer through the Internet. Other preferred embodiments allow the student to access a programmed computer via a LAN, the Intranet, or directly by utilizing a personal computer.

BRIEF DESCRIPTION OF THE DRAWINGS

FIG. 1 shows a first prompting scene.

FIG. 2 shows a first prompting scene after the student has dragged his selection over the blank bubble.

FIGS. 3–5 show a response to the student's selection.

FIG. 9 shows Chart 1.

FIG. 10 shows Chart 2.

DETAILED DESCRIPTION OF THE PREFERRED EMBODIMENTS

Simplified Personal Computer Embodiment

Figure 8:
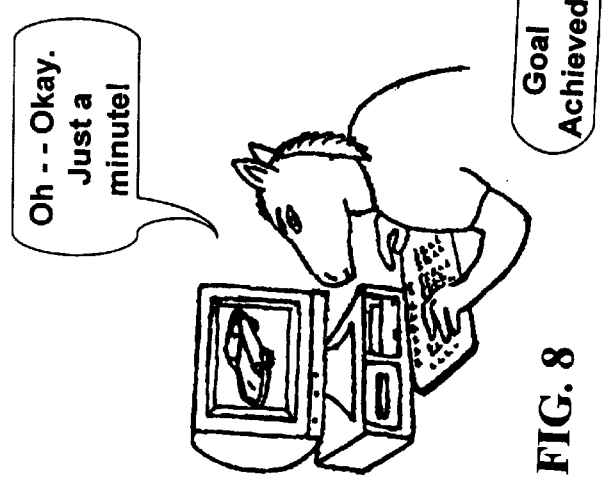
FIG. 8 shows a positive response to the second prompting scene.

In a preferred embodiment of the present invention, a student is trained in communication skills by an appropriately programmed personal computer. In one version of this embodiment, the computer processing unit is a DX166 IBM compatible personal computer manufactured by Packard Bell. The student makes entries via a keyboard and mouse and a monitor displays his entries and programmed responses to his entries (keyboard and mouse are also manufactured by Packard Bell). The program that analyzes the student's entries was created using a template from MACROMEDIA Authorware Attain 5. MACROMEDIA is a federally registered trademark of Macromedia. Inc. (a Delaware corporation with offices in San Francisco, Calif.) and refers generally to computer software used to create animated presentations. The minimum system requirements for MACROMEDIA Authorware Attain 5 are: (1) Pentiumn with floating point or similar, (2) Windows 95, (3) CD-ROM drive, 2x recommended, to access all fonts and clipart, (4) 8 MB RAM, 16 recommended, (5) VGA monitor, (6) mouse or tablet, (7) 16 MB–24 MB recommended hard disk space, depending on configuration. This embodiment provides only one response for each communication. The response is a response of the type a "good manners" advisor would recommend. It is very easy to program and requires very little effort on the part of the programmer. However, it is not representative of the real world.

Programming the Computer

A preferred embodiment of the present invention was programmed using Macromedia Authorware Attain 5. The instruction manual for Macromedia Authorware Attain 5 (*Macromedia Authorware Attain 5, Using Authorware Attain*, published by Macromedia, Inc. (1998)) was consulted by Applicant and gave sufficient details and easy to follow instructions so that Applicant was able to program a preferred embodiment of the present invention.

Displaying the Goal

After accessing the program via the computer, a goal is displayed on the monitor to the student. To achieve this goal, the student will have to use communication skills. In one embodiment, the goal is "Negotiate with the person who is currently using the computer so that you can use it." After viewing the goal, the student will click on "Next" to move to the following page.

Presenting a Prompting Scene

FIG. 1 shows the second page of the preferred embodiment, which presents a scene to the student prompting him to initiate communication to achieve his goal. Character 1 represents the student. Character 2 represents an individual that character 1 must communicate with in order to achieve his goal (i.e., use the computer.). Selections 4, 5 and 6 are potential statements that the student can make to character 2 in order to achieve his goal.

Receiving the Student's Input

The student uses his mouse to communicate with character 2. He clicks on either selection 4, 5 or 6 to select the statement he wants to make. He then drags his selection so that it covers blank-bubble 7, as shown in FIG. 2. In FIG. 2, the student selected selection 5.

Presenting a Response Scene

FIGS. 3–5 show response scenes that relate to the student's input. FIG. 3 depicts a very negative response that will be displayed if the student makes selection 5 (FIG. 2).

To try again the student needs to click on back-button 8. FIG. 4 depicts a response that will be displayed if the student makes selection 4. While this comment is not as abrasive as that depicted in FIG. 3, it still does not enable the student to achieve his goal. FIG. 5 depicts a positive response and will be displayed if the student makes selection 6 (FIG. 1). The student clicks on next-button 9 to proceed with the program.

Presenting a Second Prompting Scene

Figure 6:
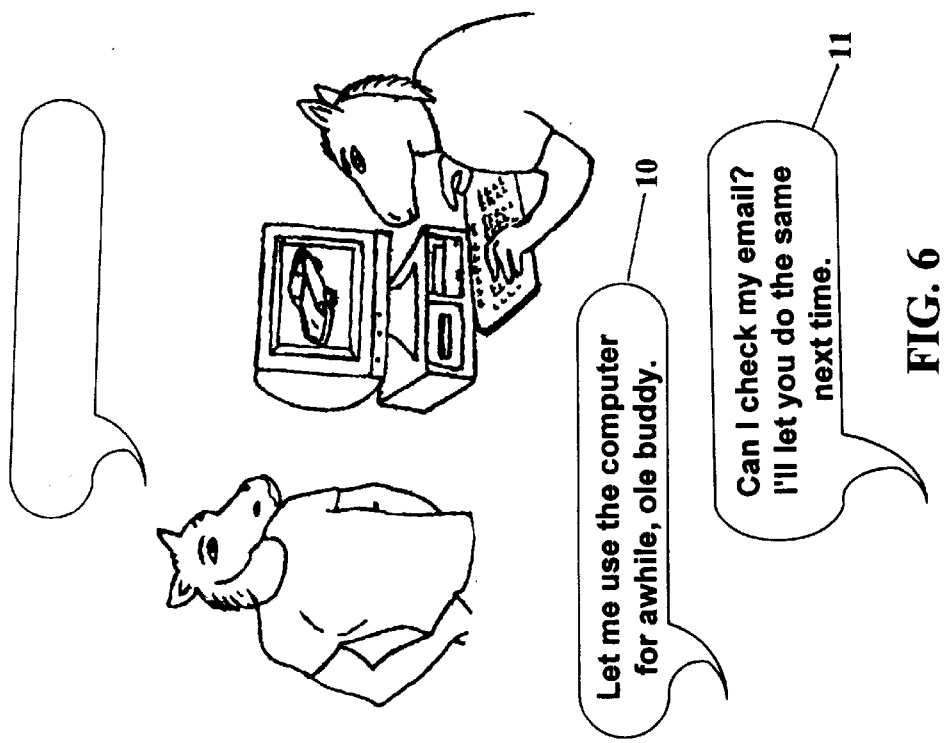
FIG. 6 shows a second prompting scene.

FIG. 6 depicts a second prompting scene. As in FIG. 1, the student is presented with a second set of potential selections 10 and 11. One of the statements will enable the student to achieve his goal and the other one will not.

Presenting a Second Response Scene

Figure 7:
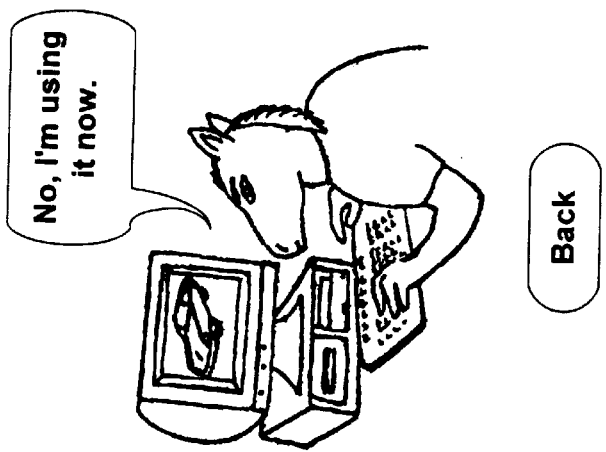
FIG. 7 shows a negative response to the second prompting scene.

FIGS. 7 and 8 show a second response scene. FIG. 7 shows the response to selection 10. If the student had chosen selection 10, he would not have met his goal. FIG. 8 shows a positive response that would have been given if the student had chosen selection 11. A congratulatory message of "GOAL ACHIEVED" is displayed at the bottom of FIG. 8.

Real World Embodiment

In a second preferred embodiment it is recognized that in communication many potential responses are possible but that probability factors can be put on a number of potential responses. Also, the probability of a particular response to a particular communication depends to a large extent on who the people are. For example, the handsome high school football hero may get a different response from a beautiful cheerleader than would the class nerd. Thus, this real world embodiment provides a description of the scene and of the commnunicators and also provides at least a few alternate responses. These responses are given probability factors that correspond to a real world analysis by experts or actual experiments. Therefore, for a given scene and communicators, the responses are not always the same (as in the real world). This embodiment would show that sometimes a bad communication could result in a good result and that good communications sometimes results in a bad result. However, it will also show that good communications usually result in better results than bad communications.

In the real world, the likelihood that the class nerd is going to get a date with the beautiful cheerleader is very low, no matter how good he is at communication. Also the handsome football hero can be pretty successful even with relatively poor communication skills. This is the real world! But the program will teach that with good comnmunication, the nerd can do better. Also, even the handsome football hero can even improve his successes with better communication skills.

In this embodiment, after the student logs on and views his goal, the computer will prompt him to enter the identity of character 1. For example, the goal may be to "Get a date tonight with the beautiful high school cheerleader." The student will then choose from the following list of identities for character 1: 1) handsome, well-dressed football hero (FH), 2) good looking, but sloppily groomed surfer (S), or 3) average looking, socially uninvolved class nerd (CN).

After entering his selection for character 1, the student moves on to the first prompting scene. In this embodiment, probability factors are programmed into a selection of potential responses. Chart 1 (shown in FIG. 9) shows that the probability of getting a date with the beautiful high school cheerleader varies depending what is said as well as who is saying it. For example, if the football hero initiates communication with the cheerleader by saying, "Hello Beth," there is a 95% chance she will respond by saying, "Hi." However, if the class nerd says the same exact thing, "Hello Beth," there is only a 60% chance she will say "Hi." Moreover, there is a 10% chance that the cheerleader will tell the class nerd to get lost, even though he selected the most appropriate initiating communication.

In a preferred embodiment, in order to successfully achieve his goal (i.e., get a date with the beautiful high school cheerleader), the student will have to get the most positive response from character 2. For example, by referring to chart 1, if the surfer initiates communication with the cheerleader by stating, "Hey, Yo!" and she responds by stating, "Huh?" (40% probability) then the student will have to click on the back-button 8 (FIG. 3) and try initiating communication again. However, if she responded with, "Hi," (40% probability) then the student can click on next-button 9 (FIG. 5) and move on to the next prompting scene where he can initiate follow up communication (Chart 1). In order to achieve his goal of getting the date, the surfer needs to get the cheerleader to say, "Sure." If the surfer states, "You're going out with me tonight, and that's final," there is a 5% chance that the cheerleader will say, "Sure." If she does, then a congratulatory message of, "Goal achieved!" will be displayed on the screen. However, it is much more likely that she will tell him to "Get lost!" (60% probability) if the surfer states, "You're going out with me tonight, and that's final." If she tells him to get lost, the student will be required to hit back-button 8 to try again. For the greatest probability of getting the date (80% probability of success), the surfer should ask politely, "Would you like to have dinner and see a movie with me tonight?"

Third Preferred Embodiment

Another embodiment does not let the student "try again." In the first preferred embodiment, if the student selected any statement other than the most appropriate statement, he got a negative response from character 2 and was prompted to hit back-button 8 (FIG. 3) and try again. In the second preferred embodiment, if the student received anything other than the most positive response, he was prompted to hit back-button 8 and try again. In the real world, a communicator can seldom truly start over with a fresh slate. Instead he must live with what he said earlier and what was said to him earlier and attempt to achieve his goal in spite of the earlier statements.

For example, by referring to Chart 1 (FIG. 9), if the class nerd approaches the beautiful cheerleader and states, "Hey, Yo!" there is an 80% chance she will tell him to get lost. In this embodiment, instead of starting over again, the student continues with his current line of approach to try to get the date. The next prompting scene will prompt the student to choose from the three follow-up communication statements depicted in Chart 1. However, now the probability of success will be less because he did not initiate communication with the most appropriate statement. By referring to Chart 2 (FIG. 10), if the class nerd now asks the cheerleader, "Would you like to have dinner and see a movie with me?" there is only a 2% chance that she will say yes. It should be noted that if he had initiated his communication by stating, "Hello Beth," then there would be an 8% chance she would say yes. Also, note that if he had chosen the least appropriate initiation statement of, "Hey you! Look here!" he would only have a 0.5% chance of achieving his goal.

It should be noted that the data displayed in Charts 1 and 2 are speculative and that there has currently not been sufficient research to fill in Charts 1 and 2 with experimental results. However, Charts 1 and 2 do reflect an intelligent approximation of what the results probably are. Surveys or focus group research could gather stronger data on certain group types such as cheerleaders, various athletes, models, aspiring actors, ethnic identities, cultural identities, or national identities. Despite the fact that Charts 1 and 2 are speculative in nature, the second and third embodiments are still extremely useful in illustrating that sometimes a bad communication can result in a good result and a good communication can result in a bad result. However, more importantly, it shows that good communications usually result in better results than bad communications, despite the identity of the communicator.

Fourth Preferred Embodiment

This embodiment modifies the first preferred embodiment to require greater student interaction with the scenario to achieve results. For example, after selecting the statement he wants to make, the student drags the selection so that it covers blank-bubble 7. After the student drops the selection over blank-bubble 7, the text of the display changes to lower relief (i.e., it becomes lighter in shade). To communicate the statement to character 2, the student must then click on each word in sequence. As he does so, the computer plays an audio recording of the word that the student clicked and the lower relief text becomes brighter. By combining increased student involvement with the scenario and adding the lower relief and audio features, the educational impact is maximized. The student's attention level is further increased in that the tasks require sustained hand, eye, ear, and mind involvement.

Internet Version

Another preferred embodiment of the present invention involves the use of the Internet. In this embodiment, the programmed computer is associated with a WEB site. Students can access the WEB site through the Internet. The advantage of this embodiment is that a large number of students, in various physical locations throughout the world, can have access to the programmed computer. At the time of the filing of this application, the number of users who can access a WEB site simultaneously is limited depending on the capability of the WEB site equipment.

LAN Version

Another preferred embodiment of the present invention involves the use of a LAN. In this embodiment, a host computer has been programmed in a manner consistent with the present invention. Students, operating interlinked computers can access the host computer through the LAN. The advantage of this embodiment is that only one computer, the host computer, needs to be programmed. Other computers connected to the LAN can access the host computer to utilize the present invention. This embodiment is preferable, for example, for a high school where a LAN can be established and operated within the high school.

Intranet Version

Another preferred embodiment of the present invention involves the use of the Intranet. In this embodiment, a host computer has been programmed in a manner consistent with the present invention. An internal web is then established connecting users to the host computer via the Intranet. The internal web cover one location as with the LAN version (for example, a high school) or it can extend to several physical locations. For example the Intranet can be set up to connect several different high schools in the same school district. Then, only one computer in the school district would need to be programmed. Students in the school district could access this computer through the Intranet through computers located at their respective schools.

Other Modifications

Although MACROMEDIA Authorware Attain 5 was used to program a preferred embodiment of the present invention, many other programming languages could be used as well. For example, it would also be possible to program the present invention utilizing C++. Although the FIG. 1 depicted selections 4–6 as being talk bubbles, it is also possible to represent the selections as being thought bubbles. This would help reinforce to the students that one should think before he speaks. In the fourth preferred embodiment, it was stated that in order to reinforce the correct selection in the student's mind, the student is required to click on each word in sequence to hear an audio recording of each particular word. It is also possible to require the student just to click on the entire sentence. He would then hear an audio recording of that entire sentence. In a previous embodiment, it was described how there were two prompting scenes and two response scenes. However, there can be as few as one prompting scene and response scene or as many scenes as the programmer desires. In other words, in another preferred embodiment, the student would have to go through a large number of communications with character 2 before he finally achieved his goal.

In the second and third embodiment it was described how the student might select from a group of different characters 1 (i.e., the football player, the surfer and the class nerd). However, it is also possible to program the present invention so that the student may select from a group of different characters 2. In other words, it may be easier to "get a date" if you are asking an average looking girl rather than a beautiful cheerleader.

Under the sub-heading of the first preferred embodiment "Displaying the Goal" it was described how a goal is first displayed to the student. It is also possible to display goals in conjunction with a broader skill curriculum. The goal of "getting to use the computer even though someone else is using it" can fall under the skill curriculum of Learning How to Ask Other People for Things They Have. For example, after a student logs on, the screen will inform him that the skill curriculum is "learning how to ask people for things they have." The goals displayed under this skill curriculum could be: 1) getting to use the computer even though someone else is using it, 2) getting to operate the television remote control even though someone else is doing it, 3) getting to play with the basketball even though someone else is playing with it, and 4) getting to sit in the front seat of the car even though someone else is already sitting there.

In the above embodiments, the goals that were discussed were related to 1) getting to use the computer even though someone else is presently using it, and 2) asking a girl out on a date. However, there are many other goals to achieve and lessons that can be practiced utilizing the present invention. For example, some possible lessons requiring the use of communication skills are: 1) How to communicate during a job interview, 2) How to apologize to someone, 3) How to ask for a raise, 4) How to introduce yourself to your date's parents, 5) How to let someone know you want to borrow something they have, 6) How to handle a customer's complaint, 7) How to introduce yourself, 8) How to give compliments or show appreciation, 9) How to resist peer pressure, 10) How to complain constructively, 11) How to problem solve effectively and negotiate, 12) How to ask questions, 13) How to make conversation, 14) How to handle compliments, criticism and insults, 15) How to state your feelings, and 16) How to calm someone.

It is also possible to utilize the present invention for teaching student to communicate effectively utilizing a foreign language. For example, the student's character 1 could approach a character 2 where character 2 speaks only a foreign language. To communicate effectively with character 2, the student must select from a group of sentences that character 2 would understand.

It is also possible to utilize the present invention to teach a student to communicate effectively with someone from a different culture. For example, the student's character 1 could approach a character 2 where character 2 is from a different culture. To communicate effectively with character 2, the student must select from a group of sentences that character 2 would appreciate considering his culture. For example, a statement that would be perfectly acceptable in the student's culture, may be not acceptable or even offensive to character 2.

While the above description contains many specifications, the reader should not construe these as limitations on the scope of the invention, but merely as exemplifications of preferred embodiments thereof. Therefore, the attached claims and their legal equivalents should determine the scope of the invention.

I claim:

1. A method for teaching communication skills, said method comprising the steps of:

A) utilizing a computer network to display on a computer monitor of a student a goal relating to improving communication or behavior skills of said student, B) presenting through said network at least one prompting scene, wherein said at least one prompting scene relates to said goal, wherein said at least one prompting scene comprises:

1) a first character representing the student, 2) at least one second character representing at least one person to whom the student will need to communicate to achieve said goal, and 3) a plurality of sentences the student may select, wherein at least one of said plurality of sentences will help the student achieve said goal and at least one of said plurality of sentences will not help the student achieve said goal, C) receiving from the student through said network his selection from said plurality of sentences, and D) presenting through said network at least one response scene, wherein said at least one response scene is positive if the student's selection was at least one of said plurality of sentences that will help the student achieve said goal, and wherein said at least one response scene is negative if the student's selection was at least one of said plurality of sentences that will not help the student achieve said goal.

2. The method as in claim 1, further comprising the step of displaying a congratulatory message after said goal is achieved.

3. The method as in claim 1, wherein said first character and said at least one second character is selected by the student from a plurality of first characters and a plurality of second characters.

4. The method as in claim 1, wherein said first character and said at least one second character each comprise an identity, wherein the probability of success of achieving said goal is determined by said identity of said first character and said identity of said at least one second character.

5. The method as in claim 1, wherein said computer network is a LAN.

6. The method as in claim 1, wherein said receiving from the student through said network his selection comprises the sub-steps of:
   A) clicking on one of said plurality of sentences to define a selected sentence,
   B) dragging said selected sentence to cover a blank-bubble, and
   C) dropping said selected sentence over said blank-bubble.

7. The method as in claim 1, further comprising the sub-steps of:
   A) clicking on each word of said selected sentence,
   B) brightening said each word from lower relief after said clicking on each word, and
   C) playing an audio recording of said each word after said clicking on each word.

8. A computer system to teach a student communication skills comprising:
   A) a means for utilizing a computer network to display on a computer monitor of a student a goal relating to improving communication or behavior skills of said student,
   B) a means for presenting through said network at least one prompting scene, wherein said at least one prompting scene relates to said goal, wherein said at least one prompting scene comprises:
      1) a first character representing the student,
      2) at least one second character representing at least one person to whom the student will need to communicate to achieve said goal, and
      3) a plurality of sentences the student may select, wherein at least one of said plurality of sentences will help the student achieve said goal and at least one of said plurality of sentences will not help the student achieve said goal,
   C) a means for receiving from the student through said network his selection from said plurality of sentences, and
   D) a means for presenting through said network at least one response scene, wherein said at least one response scene is positive if the student's selection was at least one of said plurality of sentences that will help the student achieve said goal, and wherein said at least one response scene is negative if the student's selection was at least one of said plurality of sentences that will not help the student achieve said goal.

9. A computer system to teach a student communication skills as in claim 8, further comprising a means for displaying a congratulatory message after said goal is achieved.

10. A computer system to teach a student communication skills as in claim 8, wherein said first character and said at least one second character is selected by the student from a plurality of first characters and a plurality of second characters.

11. A computer system to teach a student communication skills as in claim 8, wherein said first character and said at least one second character each comprise an identity, wherein the probability of success of achieving said goal is determined by said identity of said first character and said identity of said at least one second character.

12. A computer system to teach a student communication skills as in claim 8, wherein said computer network is a LAN.

13. A computer system to teach a student communication skills comprising:
   A) a processor, and
   B) a memory connected to said processor and storing a program for controlling the operation of said processor, said processor operative with said program in said memory to:
      1) utilize a computer network to display on a computer monitor of a student a goal relating to improving communication or behavior skills of said student,
      2) present through said network at least one prompting scene, wherein said at least one prompting scene relates to said goal, wherein said at least one prompting scene comprises:
         a) a first character representing the student,
         b) at least one second character representing at least one person to whom the student will need to communicate to achieve said goal, and
         c) a plurality of sentences the student may select, wherein at least one of said plurality of sentences will help the student achieve said goal and at least one of said plurality of sentences will not help the student achieve said goal,
      3) receive through said network from the student his selection from said plurality of sentences, and
      4) present through said network at least one response scene, wherein said at least one response scene is positive if the student's selection was at least one of said plurality of sentences that will help the student achieve said goal, and wherein said at least one response scene is negative if the student's selection was at least one of said plurality of sentences that will not help the student achieve said goal.

14. A computer system to teach a student communication skills as in claim 13, wherein said processor operative with said program in said memory also displays a congratulatory message after said goal is achieved.

15. A computer system to teach a student communication skills as in claim 13, wherein said first character and said at least one second character is selected by the student from a plurality of first characters and a plurality of second characters.

16. A computer system to teach a student communication skills as in claim 13, wherein said first character and said at least one second character each comprise an identity, wherein the probability of success of achieving said goal is determined by said identity of said first character and said identity of said at least one second character.

17. A computer system to teach a student communication skills as in claim 13, wherein said computer network is a LAN.

18. A method for operating a computer having a monitor to teach a student communication skills comprising the steps of:
   A) displaying a goal on said monitor,
   B) presenting at least one prompting scene, wherein said at least one prompting scene relates to said goal, wherein said at least one prompting scene comprises:
      1) a first character representing the student,
      2) at least one second character representing at least one person to whom the student will need to communicate to achieve said goal, and 3) a plurality of sentences the student may select, wherein at least one of said plurality of sentences will help the student achieve said goal and at least one of said plurality of sentences will not help the student achieve said goal, C) receiving from the student his selection from said plurality of sentences, wherein said receiving comprises the steps of:
   1) clicking on one of said plurality of sentences to define a selected sentence.
   2) dragging said selected sentence to cover a blank-bubble,
   3) dropping said selected sentence over said blank-bubble,
   4) clicking on each word of said selected sentence,
   5) brightening said each word from lower relief after said clicking on each word, and
   6) playing an audio recording of each word after said clicking on each word, and D) presenting at least one response scene, wherein said at least one response scene is positive if the student's selection was at least one of said plurality of sentences that will help the student achieve said goal, and wherein said at least one response scene is negative if the student's selection was at least one of said plurality of sentences that will not help the student achieve said goal.

19. A method for operating a computer having a monitor to teach a student communication skills comprising the steps of:

A) displaying a goal on said monitor,

B) presenting at least one prompting scene, wherein said at least one prompting scene relates to said goal, wherein said at least one prompting scene comprises:
   1) a first character representing the student,
   2) at least one second character representing at least one person to whom the student will need to communicate to achieve said goal, and
   3) a plurality of sentences the student may select, wherein at least one of said plurality of sentences will help the student achieve said goal and at least one of said plurailty of sentences will not help the student achieve said goal, C) receiving from the student his selection from said plurality of sentences, and D) presenting at least one response scene, wherein said at least one response scene is positive if the student's selection was at least one of said plurality of sentences that will help the student achieve said goal, and wherein said at least one response scene is negative if the the student's selection was at least one of said plurality of sentences that will not help the student achieve said goal, wherein said method is for the purpose of teaching the student communication skills.

* * * * *

UNITED STATES PATENT AND TRADEMARK OFFICE
CERTIFICATE OF CORRECTION

PATENT NO. : 6,296,487 B1
DATED : October 2, 2001
INVENTOR(S) : Lotecka

It is certified that error appears in the above-identified patent and that said Letters Patent is hereby corrected as shown below:

<u>Title page, Item [54] and Column 1, lines 1-3,</u>
Title should read -- METHOD AND SYSTEM FOR FACILITATING COMMUNICATION AND BEHAVIOR SKILLS TRAINING --

Signed and Sealed this

Eleventh Day of June, 2002

*Attest:*

*Attesting Officer*

JAMES E. ROGAN
*Director of the United States Patent and Trademark Office*